United States Patent [19]
Herbert

[11] Patent Number: 5,205,685
[45] Date of Patent: Apr. 27, 1993

[54] HOLE SAW

[76] Inventor: Henry R. Herbert, 730 Lakewood-Farmingdale Rd., Howell, N.J. 07731

[21] Appl. No.: 956,385

[22] Filed: Oct. 5, 1992

[51] Int. Cl.$^5$ ............................................. B23B 51/05
[52] U.S. Cl. ................................. 408/204; 408/144; 408/207
[58] Field of Search ............ 408/202, 204, 207, 241 S, 408/703, 144, 14

[56] References Cited

U.S. PATENT DOCUMENTS

| | | | |
|---|---|---|---|
| 1,522,102 | 1/1925 | Cibelli | 408/204 |
| 4,297,059 | 10/1981 | Miyanaga | 408/204 |
| 5,082,403 | 1/1992 | Sutton et al. | 408/204 |
| 5,147,164 | 9/1992 | Fraver | 408/202 |

FOREIGN PATENT DOCUMENTS

| | | | |
|---|---|---|---|
| 2650299 | 2/1991 | France | 408/144 |
| 14287 | 2/1977 | Japan | 408/206 |
| 44489 | 4/1977 | Japan | 408/241 S |

Primary Examiner—Daniel W. Howell
Attorney, Agent, or Firm—Charles I. Brodsky

[57] ABSTRACT

A hole saw, especially suited for sheet-metal work, incorporates an annular ring surrounding the body of the saw, and located at an end adjacent its cutting edge. In accordance with the invention, the diameter of the ring is selected larger than that of the cutting teeth, to operate as a "stop" in preventing the saw from undesirably extending into the cavity where the saw makes its cut, beyond a predetermined amount. As will be described, the annular ring allows for a constant, equal pressure to be applied in using the hole saw across a work-piece while, at the same time, limiting any accidental damage to be done inside the work-piece if the hole saw were to penetrate too far.

7 Claims, 1 Drawing Sheet

HOLE SAW

FIELD OF THE INVENTION

This invention relates to hole saws, and, more particularly, to a hole saw which is particularly suitable for sheet-metal work.

BACKGROUND OF THE INVENTION

As is well known and understood, sheet-metal hole saws are oftentimes used to drill into such cavities and enclosures as electric control boxes, by technicians working in the field. Similarly, such hole saws are oftentimes used by air-conditioning repair workers drilling about a compressor, in areas adjacent the coolant coil, or where electrical contacts are present.

As is well known in these and other uses, the operation with a hole-saw is typically "one-handed"—which creates a problem if an unequal pressure is applied in utilizing the saw in making its cut. For example, it is not unusual to find that one side of the hole saw goes in faster, or easier than the other, causing the drill to twist around, oftentimes ripping the sheet metal, or tearing the cutting teeth. On other occasions, even if the binding of the teeth that results is not sufficient to damage the sheet metal or the bit, the force which is created by its twisting often causes wrist injury by the worker's trying to keep it under control. When it is realized that these hole saw-drill combinations are used in areas where it is not easy to see the cutting teeth or how deep they might penetrate, it is not unusual to find that the penetration that results is frequently too great, causing damage to the other components and structure inside the enclosure. As a result, it is very well known that one has to be quite careful in using such a saw—not the least bit of which involves its fairly expensive cost, and which customary usage has shown, results in its being discarded after only several operations.

OBJECTS OF THE INVENTION

It is an object of the present invention, therefore, to provide a hole saw which eliminates these disadvantages of prior art constructions.

It is another object of the invention to provide a hole saw which minimizes these disadvantages, at only a slight increase in expense.

It is a further object of the invention to provide a hole saw which allows confidence in its use—both from a standpoint of safety, and from a standpoint of knowing that the objective for which it is being used, is almost always satisfied, with a minimum of exposure to danger to the user and damage to the saw and workpiece themselves.

SUMMARY OF THE INVENTION

As will become clear hereinafter, a hole saw constructed according to the invention incorporates an annular ring surrounding the body of the saw, at a position adjacent to its cutting edge. In accordance with the invention, furthermore, the diameter of the annular ring is selected larger than that of the cutting teeth, to operate as a "stop" in preventing the saw from undesirably extending into the cavity where the saw makes its cut, beyond a predetermined amount. As will be seen, such annular ring allows for a constant, equal pressure to be applied in using the hole saw across the work-piece, while at the same time, limiting any accidental damage that might be done inside the work-piece if the hole saw were to penetrate too far.

As will further be described, the annular ring of the invention may be fabricated as a TEFLON-coated band, or as a band of mild-steel. When used in an arrangement where the diameter of the cutting teeth is greater than the diameter of the cylindrical body forming the saw—as is usually the situation, the annular ring will also be noted to be of a diameter greater than that of the circumference of the cylindrical body. When incorporated particularly for sheet-metal work, the hole saw of the invention—as will be described below, will also be seen to incorporate the annular ring a distance from the leading edge of the cutting teeth approximately 3/16 inch, to limit just how far the cutting teeth can penetrate into the work-piece of the enclosure. For cutting teeth of ¼ inch as is typically utilized in cutting sheet-metal, it will be appreciated that the annular ring would then be positioned, according to the invention, at approximately 1/16 inch from the trailing edge of the cutting teeth.

In a further embodiment of the invention, usable for cutting materials other than sheet-metal, the hole saw of the invention will be seen as including one or more apertures along its body to assist in discarding shavings produced during the cutting process. In the construction illustrated below, these apertures will be seen to be in the nature of longitudinal slots.

BRIEF DESCRIPTION OF THE DRAWING

These and other features of the present invention will be more clearly understood from the following description, taken in connection with accompany drawing, in which.

DETAILED DESCRIPTION OF THE DRAWING

Figure 1:
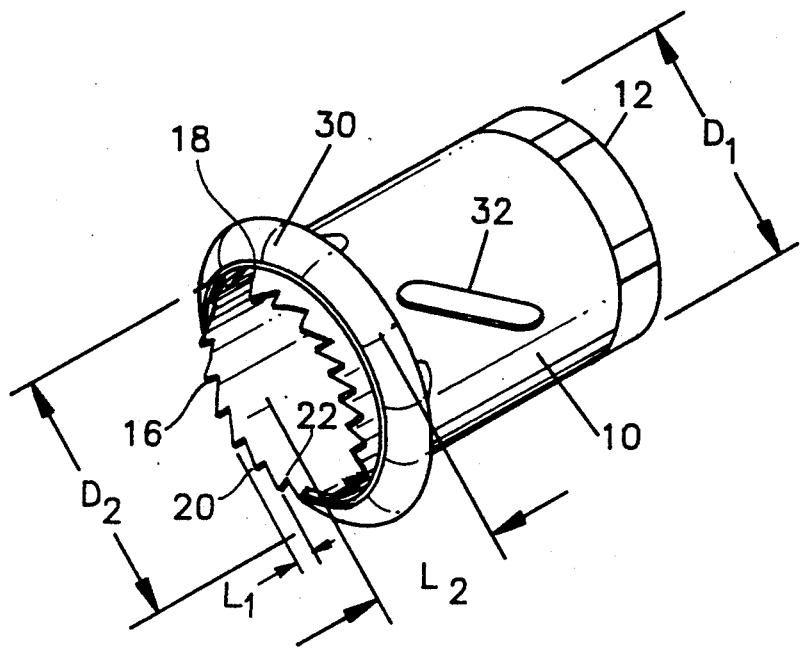
FIG. 1 is a perspective view of a hole saw embodying the principles of the present invention.
Figure 3:
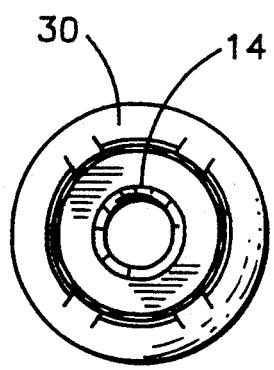
FIG. 3 is a top view of the saw of the invention.
Figure 2:
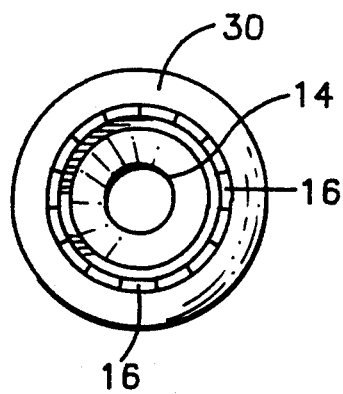
FIG. 2 is a bottom view of the hole saw.

Referring to the drawing, the hole saw of the invention will be seen to incorporate a cylindrical body 10 of diameter $D_1$, and having a first end 12 adapted to be secured to the mandrel of a drill through any appropriate threading internal thereof, as at 14. A set of cutting teeth 16 is positioned at an opposite end of the cylindrical body, as at 18, and consists of a plurality of individualized teeth arranged in a circular configuration on the cylindrical body 10, of a diameter $D_2$—equal to, or slightly larger than the diameter $D_1$. As indicated, each one of the cutting teeth is provided with a leading edge 20 and a trailing edge 22. When the hole saw is to be utilized in the cutting of sheet-metal—typically of the thickness of up to ¼ inch thick, the distance $L_1$ between the leading edge 20 and the trailing edge 22 is, likewise, of the order of that same ¼ inch. As will be understood, when using such a hole saw as so far described, once an insert is cut by the teeth 16 into a work-piece—be it of sheet-metal or otherwise, the cylindrical body 10 is permitted to penetrate into the cavity, as its diameter $D_1$ would be less than the diameter $D_2$ of the circular configuration of the cutting teeth 16. If the hole saw is, at the same time, inserted into the cavity at other than a right-angle under action by the user applying any degree of force thereto, it will be appreciated how the cutting teeth 16 may bind with the sheet-metal or other material, and either result in a tearing of the material, or a ripping of the individual teeth.

In accordance with the present invention, the hole saw of the drawing also incorporates an annular ring 30, and set back from the trailing edge 22 of the cutting teeth 16 a distance $L_2$. Such annular ring 30, of any desired thickness, may be fabricated as a TEFLON-coated band, or as a mild-steel, and in either event functions as a "stop" to prevent the cutting teeth 16, or cylindrical body 10 from extending further into the cavity after the cut is made, beyond a length equal to that of the distance $L_2$. Such annular ring 30 may be secured in any appropriate manner with the cylindrical body 10, as by tack-welding, heliarcing or any applicable adhesive joining. For use in cutting sheet-metal, for example, of thickness of up to ⅛ inch, the distance $L_2$ may be of the order of 1/16 inch, or less. Analysis has shown that the provision of such annular ring about the cylindrical body 10 should not increase the sales price of the hole saw by more than $2.00.

As will be appreciated by those skilled in the art, having such a sturdy, securely-fastened annular ring 30, in place, the user will experience a high degree of confidence in knowing that the hole saw will not penetrate into the cavity of the work-piece beyond the position of the annular ring. Knowing that, the worker can also be confident that if straight-forward constant pressure were applied, the hole saw—even making its cut—would not twist in any manner, causing the cutting teeth to catch, and either causing damage through tearing the sheet-metal, or ripping out the cutting teeth. In such manner, additionally, the worker will realize that by limiting the depth into the cavity where the hole saw is making its cut, the possibility of damaging any parts within the enclosure, or making electrical contact with any energized components therein, will be kept to a minimum, as well.

Whereas the hole saw as thus described is of a particular advantage in the cutting of sheet-metal, it will be appreciated by those skilled in the art that its usefulness continues in cutting any type of material—be it wood, or otherwise. To facilitate its applicability in such environments, the hole saw of the drawing is also provided with one or more apertures 32, in the configuration, for example, of a longitudinal slot, to ease cleaning out of any of the shavings produced during cutting, merely by clearing the debris away with a screwdriver, or other instrument. Obviously, the aperture permits the shavings to, in part, escape by flowing through just as a result of the cutting action itself, and any such items as may clogged need be pried away by any pointed object.

While there have been described what are considered to be preferred embodiments of the present invention, it will be readily understood by those skilled in the art that modifications can be made without departing from the scope of the teachings herein of utilizing an annular ring to add both confidence and a high degree of safety in the use of hole saws—whether being used for sheet-metal work, or for other materials. For at least such reason, therefore, resort should be had to the claims appended hereto for a true understanding of the scope of the invention.

I claim:

1. A hole saw comprising:
   a cylindrical body of diameter $D_1$, having a first end adapted to be secured to a drill;
   a set of cutting teeth at a second end of said body arranged in a circle on said body of a diameter $D_2$;
   an annular ring surrounding said body at a point adjacent said second end, of a diameter greater than that of said cylindrical body; and
   wherein said ring is fabricated as a TEFLON-coated band.

2. The hole saw of claim 1 wherein said annular ring is of a diameter greater than that of said circle of cutting teeth.

3. The hole saw of claim 1 wherein said diameter of said circle of cutting teeth is greater than the diameter of said cylindrical body.

4. The hole saw of claim 1 for sheet-metal work, wherein said set of cutting teeth include teeth provided with both a trailing edge and a leading edge, and wherein said annular ring is displaced from said trailing edge of said teeth a distance of the order of 1/16 inch.

5. The hole saw of claim 1 for sheet-metal work, wherein said set of cutting teeth include teeth provided with both a trailing edge and a leading edge, and wherein said annular ring is displaced from said leading edge of said teeth a distance of the order of 3/16 inch.

6. The hole saw of claim 1 wherein said cylindrical body is apertured along its length for discharging shavings produced during a cutting process.

7. A sheet-metal hole saw comprising:
   a cylindrical body of diameter $D_1$;
   a cylindrical set of cutting teeth at a second end of said body, arranged in a circle on said body of diameter $D_2$ greater than that of said body, and including teeth provided with both a trailing edge and a leading edge;
   an annular ring surrounding said cylindrical body at a point adjacent said second end, of a diameter $D_3$ greater than that of said cylindrical body;
   wherein said annular ring is displaced from said trailing edge of said teeth a distance of approximately 1/16 inch or less;
   and wherein said annular ring is fabricated as a TEFLON-coated band.

* * * * *